(No Model.)

J. J. B. FREY.
PLUMBER'S COUPLING FOR THE BOWLS OF WATER CLOSETS.

No. 260,966. Patented July 11, 1882.

WITNESSES:
C. Neveux
C. Sedgwick

INVENTOR:
J. J. B. Frey
BY Munn & Co.
ATTORNEYS.

UNITED STATES PATENT OFFICE.

JOSEPH J. B. FREY, OF NEW YORK, N. Y.

PLUMBER'S COUPLING FOR THE BOWLS OF WATER-CLOSETS.

SPECIFICATION forming part of Letters Patent No. 260,966, dated July 11, 1882.

Application filed April 11, 1882. (No model.)

*To all whom it may concern:*

Be it known that I, JOSEPH J. B. FREY, of the city, county, and State of New York, have invented a new and useful Improvement in Plumbers' Couplings for the Bowls of Water-Closets, Wash - Basins, Urinals, and other Structures, of which the following is a full, clear, and exact description.

This invention relates to couplings for connecting metal or other pipes with articles or structures made of earthenware, glass, or other vitreous materials—as, for instance, with the bowls of water-closets, urinals, or wash-basins made of porcelain. It is also applicable to couplings for uniting pipes made of earthenware or glass. It will suffice here, however, to describe it as applied to water-closets, urinals, and wash-basins having bowls made of porcelain. In order to connect such bowls with the necessary pipes, either for supplying water to them or for running off the waste water from them, or for providing for an escape by overflow, it is customary to construct the bowl with a short pipe or branch of the same material as and forming an integral portion of it, with which branch the requisite metal or other pipe is united by a suitable joint. Heretofore much difficulty has been experienced in making a close joint for such connections without using putty or cement, which are objectionable, and great risk is incurred of breaking the projecting porcelain branch of the bowl by screwing or tightening up its connection with the pipe, which breakage involves or includes the whole bowl, thereby making the accident a very expensive one.

My invention consists in a coupling of peculiar construction, whereby a tight joint may be obtained without the use of putty or cement and without risk of fracturing the porcelain or other like pipe or branch, and in which a divided screw ring or sleeve fitted over said pipe or branch, back of a collar thereon, is combined with a freely-rotating coupling-nut on the end of the pipe with which the connection is to be made, and is further combined with an interposed soft or elastic washer, against which the collared end of the branch is brought to bear when tightening up the coupling, substantially as herein described.

Reference is to be had to the accompanying drawings, forming a part of this specification, in which similar letters of reference indicate corresponding parts in both the figures.

Figure 1:
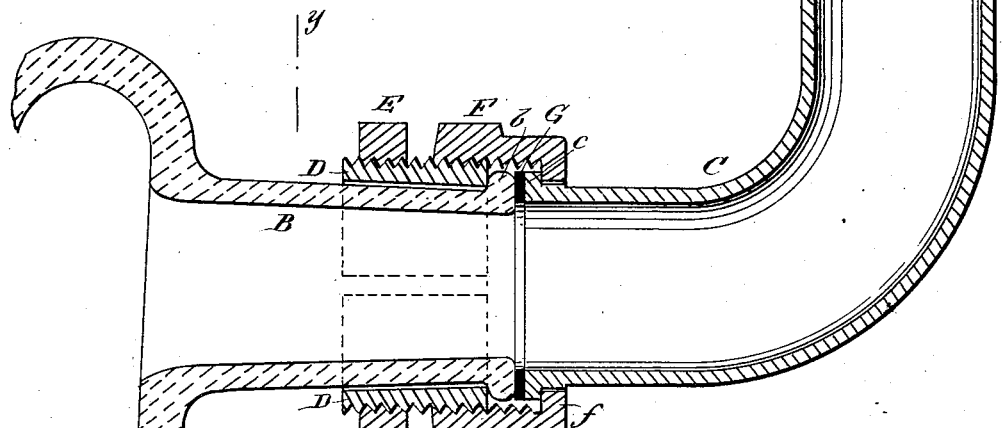
Figure 2:
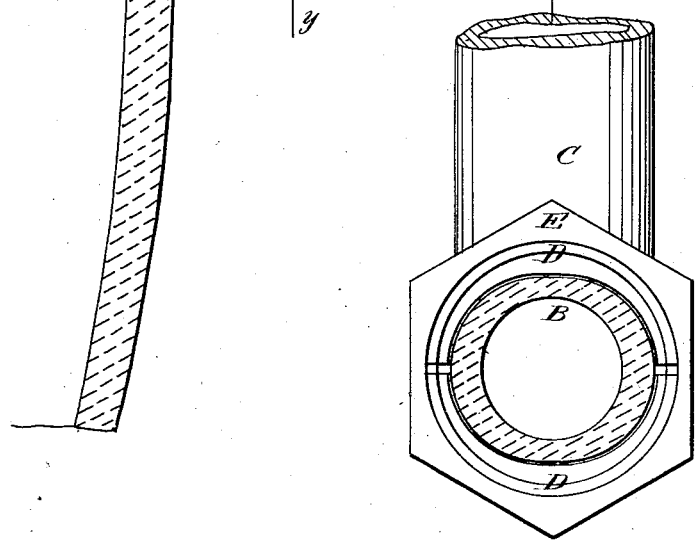

Figure 1 represents a vertical section, on the line *x x* in Fig. 2, of my improved coupling applied to connect a pipe with the bowl of a water-closet; and Fig. 2, a further vertical section of the same on the line *y y* in Fig. 1.

A indicates the one side of the porcelain bowl of a water-closet, and B a branch formed of the same material and being an integral portion of the bowl. Said branch, with which it is desired to connect a metal pipe, C, either for the purpose of supplying the bowl with water or for ventilating it, is made with an externally-projecting collar, $b$, on its outer end, and the pipe C also with a collar, $c$, on its contiguous end.

D is a ring or sleeve made in two or more longitudinal sections to provide for fitting it on or around the branch B back of the collar $b$. Said ring has a screw-thread on its exterior periphery, the diameter of which is somewhat greater than that of the collar $b$, to provide in part for the passage over said collar of a nut, E, to hold the sections of the screw ring or sleeve D together. This nut E forms a tie for said sections, to prevent them dropping apart and to hold them in position for the screw nut or box F of the coupling to engage with the screw-thread on the ring D. By making said sleeve or ring of greater exterior dimensions than the collar $b$, or at least of no lesser dimensions than it, provision is made for the engagement of the coupling-nut F with the externally-screw-threaded and sectionally-constructed sleeve D, and for receiving the collar $b$ of the branch B within it.

The nut F turns loosely upon the pipe C, and is made with a rear inner flange, $f$, to allow of the collar $c$ on the pipe acting as a stop to it, as in various hose and other couplings.

G is a washer, of rubber, leather, or other soft or yielding material, inserted within the coupling-nut F, and lying against the outer face of the collar $c$, for the collar $b$ to bear against when the coupling is screwed up.

Various means may be adopted for preventing the divided screw-threaded sleeve D from turning when screwing up the coupling-nut F. Thus it may be held from turning by a suitable tool applied to it by a feather on the branch B, fitting on a groove in the sleeve, by a rubber band slipped over the branch B, against which the sectionally-constructed sleeve may be bound by the tie-nut E, or by constructing the exterior of the branch B of an oval or irregular shape and the interior of the sleeve D of a form to correspond, as shown in the drawings, Fig. 2.

By this construction of coupling a metal pipe may readily be connected with the brittle branch of a porcelain bowl without risk of fracturing the latter or branch portion of it, the yielding washer G acting as a cushion to ease the strain when screwing up the coupling, and as a packing to make the joint a close one without the aid of putty or cement.

By the sectional construction of the sleeve D the collar b forms no impediment for the placing of said sleeve on the branch B, and the connection of the pipe with the bowl may be either made or broken, when required, with facility and dispatch.

It will be obvious that the position of the branch B may be varied, as may also the shape of the bowl or receptacle, and the pipe C be arranged to run in any suitable direction.

Having thus described my invention, I claim as new and desire to secure by Letters Patent—

1. A coupling for pipes having collars on their contiguous ends, consisting of a combination, with said pipes, of an enlarged externally-screw-threaded sleeve constructed in two or more longitudinal sections, and arranged upon one of said pipes, a freely-rotating coupling-nut arranged around the collar end of the adjacent pipe to receive the screw-threaded sleeve within it, and a yielding washer interposed between the collars of the pipes, substantially as shown and described.

2. The combination, with a bowl or receptacle constructed of porcelain, glass, or other like brittle material, and having a projecting pipe or branch, B, made with a collar, b, on its outer end, and forming an integral portion of said receptacle, of the enlarged externally-screw-threaded sleeve D, formed of two or more longitudinal sections, the coupling-nut F, a metal pipe having a collar, c, on its outer end, and the yielding washer G, interposed between the collars b and c, essentially as and for the purposes herein set forth.

3. The tie-nut E, in combination with the enlarged externally-screw-threaded sleeve D, formed of two or more longitudinal sections, the pipe or branch B, having a collar, b, on its outer end, the pipe C, provided with an end collar, c, the coupling-nut F, and the yielding washer G, substantially as shown and described.

JOS. J. B. FREY.

Witnesses:
A. GREGORY,
C. SEDGWICK.